July 9, 1929.   A. L. BECKET   1,720,311

VEHICLE LIGHT

Filed Aug. 4, 1926

Alan L. Becket Inventor

By his Attorneys
Gifford & Scull

Patented July 9, 1929.

1,720,311

UNITED STATES PATENT OFFICE.

ALAN L. BECKET, OF EAST ORANGE, NEW JERSEY.

VEHICLE LIGHT.

Application filed August 4, 1926. Serial No. 126,961.

This invention relates to a vehicle light that is especially adapted for use as an automobile headlight, although it is not restricted to this particular use. It has been found by experience that glare caused by a concentrated source of light can be greatly diminished or overcome by illuminating the surrounding objects, thus diminishing the contrast between the brilliant source of light and the immediate vicinity thereof. For example, glare due to the brilliant headlight reflector of an automobile can be largely overcome by using an additional light source to illuminate the parts of the automobile near the headlight. By the present invention, the objection of glare is obviated without decreasing the amount of road illumination for the driver by a source of light so disposed that the background about the headlight is illuminated and does not, therefore, present such a striking contrast to the headlight itself. This is conveniently and economically accomplished by having an elongated electric lamp with two filaments, one near one end of the lamp located at the focus of a parabolic reflector, and the other near the other end of the lamp located so that it can light up the front part of the automobile or the objects in the vicinity of the headlight itself.

Figure 1:
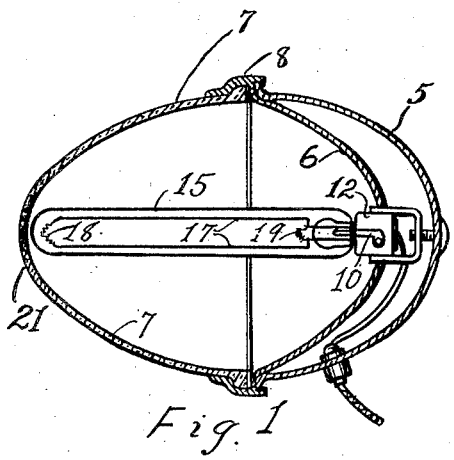
Figure 2:
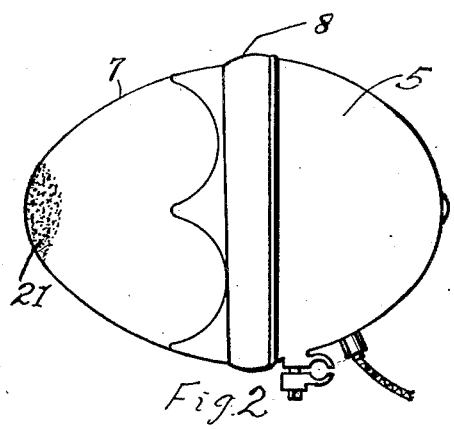
Figure 3:
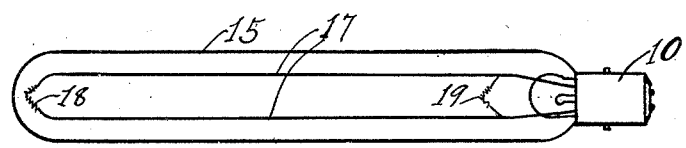

The invention will be understood from the description in connection with the accompanying drawings, in which Fig. 1 is a sectional side view of the device, and Fig. 2 is another side view. Figs. 3, 4, 5 and 6 represent side views of the electric lamp itself and its various modifications.

In the drawings, reference character 5 is used to indicate a metal headlight housing. In the housing is mounted a deep reflector 6 orificed centrally to permit the passage therethrough of a lamp socket 12 to receive the base 10 of an electric lamp. The reflector 6 may be a parabolic reflector of the well-known sort with a silvered or other reflecting surface on the inner or concave side thereof. A clear glass portion or globe 7 constitutes approximately half of the headlight and is fitted to the ring portion 8 which is secured along the rim of the housing 5 in any practical and satisfactory manner.

The glass portion 7 is provided with diffusing or reflecting means 21, if desired, that shields the eye of an approaching person from the light sources. In addition, the glass portion 7 may be made prismatic in character so as to control the light from both filaments.

The electric lamp is made in the shape of an elongated cylinder, and is provided with a base 10 that extends into the socket 10. The elongated glass bulb 15 encloses the lead-in wires 17 and filaments 18 and 19. The lead-in wires 17 are soldered in the usual manner at the base 10, and extend longitudinally of the bulb 15, and the filaments 18 and 19 are connected in parallel across the lead-in wires 17, the filament 18 being located near one end of the bulb 15, and the filament 19 being located near the other end thereof.

Figure 4:
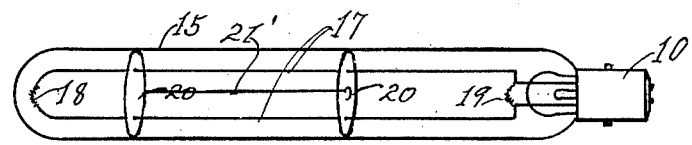
Figure 5:
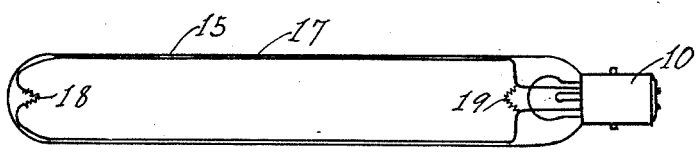
Figure 6:
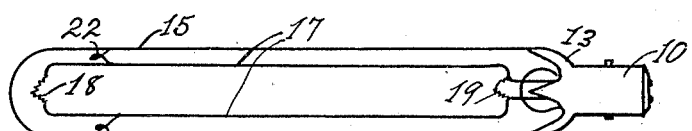

The lead-in wire 17 may be made of a metal or alloy sufficiently stiff to support the filaments 18 and 19, or one or more mica discs 20 may be inserted in the bulb 15 for supporting the lead-in wires, as shown in Fig. 4. When more than one of the discs 20 are used, they may be connected to each other by means of the wire 21'. In the modification shown in Fig. 5, the lead-in wires may be in contact with the inner surface of the bulb 15, in which case the discs 20 may be dispensed with. In the modification shown in Fig. 6, spring wire 22 is attached to leads 17 and presses against the bulb 15. In Fig. 6 is also shown a modified base 10 with supporting petals 13 integral with the base 10 and cemented to the bulb 15.

The formation of the electric lamp, the position of the filaments and their relation to the reflector 6 and glass globe 7 constitute an important feature of this invention.

It will be clear that with the electric lamp in the headlight, as indicated in Fig. 1, the filament 19 serves as the ordinary electric lamp in a reflector for headlights, while the filament 18 that is located outside of the reflector emits light rays in radial directions, thus projecting some of the rays backward to illuminate the front portions of the automobile. At the same time, the rays from the filament 18 will light up the road and adjacent objects to a certain extent, thus decreasing the contrast between the reflecting surface of the reflector and the background, so as to diminish the glare. The light rays from the filament 18 that enter the reflector are reflected back and aid in giving increased illumination on the road, and the illumination on the front part of the automobile is not only obtained directly from the light from the filament 18 but also from reflection from the road surface, which receives considerable downward light from the filament 18.

It will be obvious that this invention is not only applicable to a light that is adapted for headlights or searchlights, but that the device provides forward, backward and side illumination. It may be used, for example, as an automobile tail light, as it would have advantages with respect to illumination of the license plate and also the rear of the automobile. Small side lights of the character above described on an automobile would illuminate that part of the automobile to advantage, so that the same could be readily seen from the side, thus giving an advantage that decreases the dangers of night driving.

I claim:

A vehicle lamp comprising a housing, a concave reflector within the housing, an elongated incandescent bulb having two filaments, one filament being inside the reflector for the projection of a concentrated forward beam on the road, the other filament being outside the reflector and housing and at an appreciable distance from the forward edge of the housing, and a deep concavo-convex glass globe closing the casing and having its central portion close to the end of the bulb and the second filament, said central portion of the globe being provided with means for directing light received from the second filament in a rearward direction to illuminate the front of the vehicle on which the lamp is supported.

ALAN L. BECKET.